Patented June 21, 1949

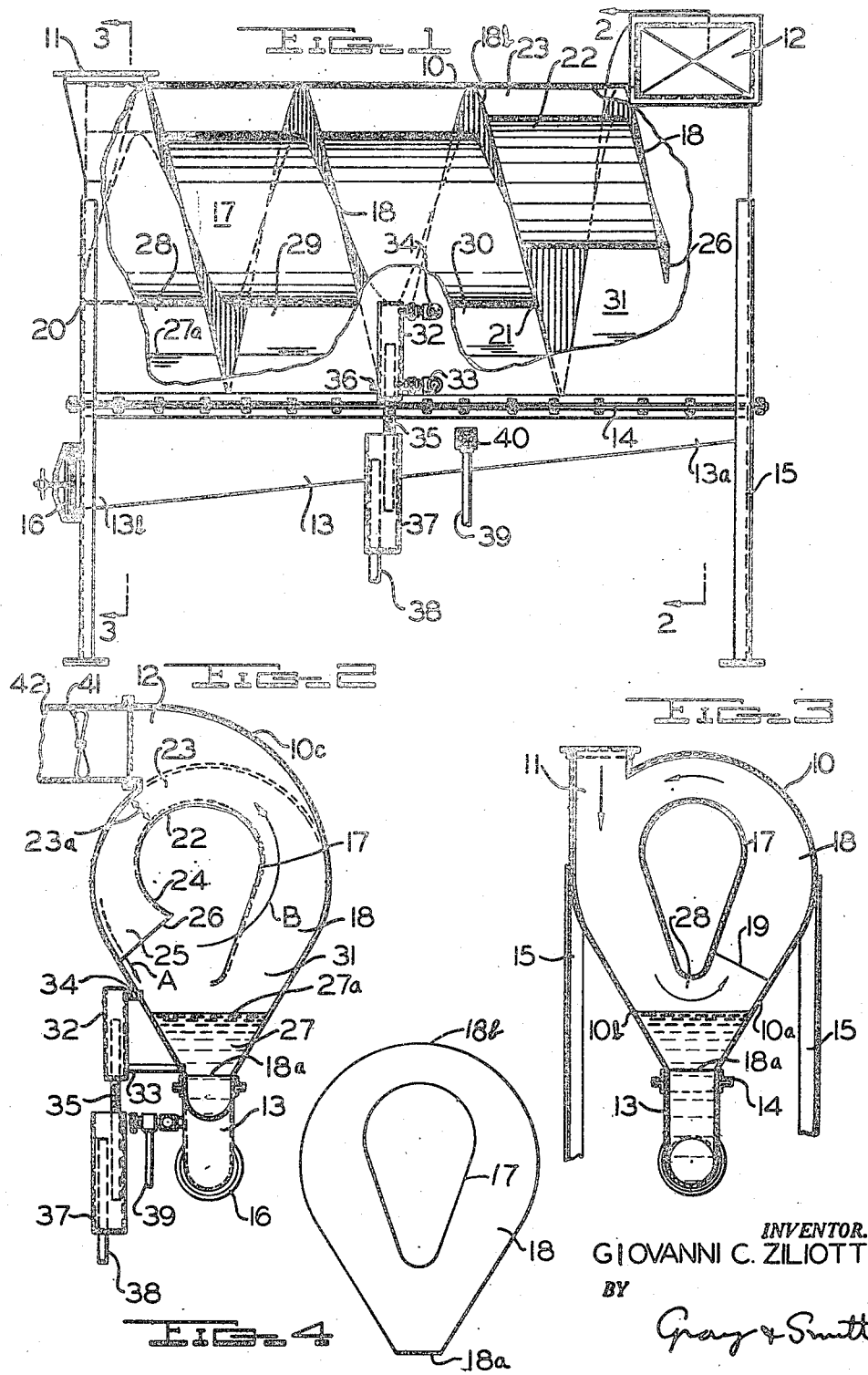

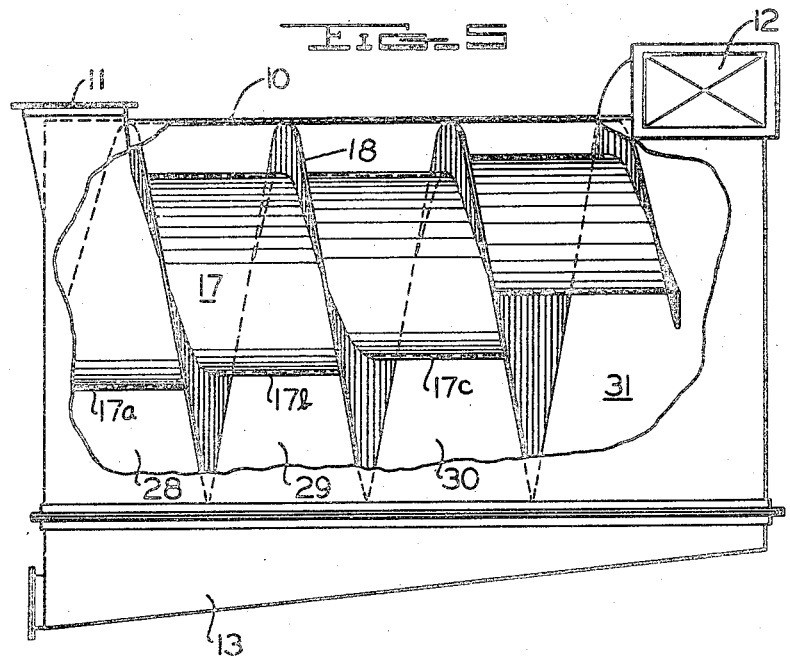
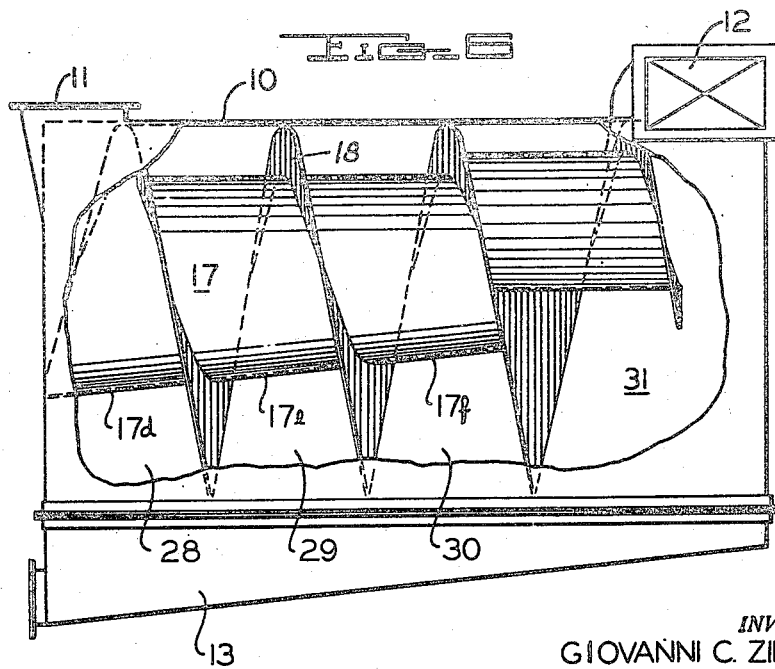

2,473,672

UNITED STATES PATENT OFFICE 2,473,672

DUST COLLECTOR

Giovanni C. Ziliotto, Lake Orion, Mich.

Application November 13, 1945, Serial No. 628,280

6 Claims. (Cl. 261—119)

This invention relates generally to air cleaners or dust collectors and especially to the class of air cleaners which utilize liquid, such as water, as a medium for entrapping the dust in the air to be cleaned and collecting the same in the form of a sludge for disposal.

Air cleaners or dust collectors of the so-called wet type have for their primary aim to bring the air and liquid into as intimate a contact as possible in order to wet the dust and other foreign particles in the air and remove it therefrom when the liquid is separated from the air passing through the cleaning apparatus. Wet dust collectors are generally considered superior to dust collectors of the so-called dry type owing to the fact that they are usually less bulky while also being much more efficient in trapping and collecting the finer dust particles in the air. Furthermore, in the use of wet dust collectors the dust extracted from the air may be more readily disposed of in the form of a sludge, eliminating the problem of disposing of masses of dry dust accumulated during the use of dry dust collectors.

Among dust collectors the so-called cyclone type is quite widely used, this collector being of the dry type utilizing centrifugal force for separating the dust from the air as the latter is whirled at high velocity in a horizontal direction and in a helical or spiral path around the vertical axis and inside surface of the cylindrical shell of the apparatus. The cyclone dry dust collector has encountered considerable favor owing to its simplicity of operation and elimination of moving parts, this despite the disadvantage of its large bulk and relatively low efficiency in the removal of finer particles from the dust laden air and the disadvantages incident to disposal of the dry dust after its collection. In some cases, attempts have been made to increase the efficiency of the dry cyclone dust collector by incorporating in the apparatus means for wetting the air inside the cyclone collector as the air is given a whirling motion, this being usually accomplished by means of sprays, jets or the like. The resulting equipment, however, has not been satisfactory since any increase in dust collecting efficiency has entailed sacrifice of simplicity in construction and operation while at the same time rendering the mechanism more complicated and more costly to manufacture.

An important object of the present invention is to provide a dust collector or air cleaner of highly efficient character which combines all of the advantages of the dry cyclone dust collector while eliminating the many disadvantages thereof and at the same time possessing the advantages of the wet type dust collector attributable to the use of liquid or water in the extraction of finer dust particles from the air.

A further object of the invention is to provide a wet cyclone type dust collector which accomplishes more efficiently by cyclonic or whirling action the task of trapping the dust borne by the air passing at high velocity through the machine, which deposits the dust at the bottom of the collector in the form of a sludge which is easily removed, and which in addition by virtue of the improved construction and operation frees the air of substantially all entrained liquid picked up during the cleaning operation.

Still another object of the invention is to provide a wet cyclone type dust collector which accomplishes the foregoing important purposes without the use of any moving parts, disregarding of course the fan or blower equipment used to induce flow of air through the machine, and which in addition eliminates the use of such devices, common to other types of air cleaners, as baffles, screens, filters, moisture eliminators, nozzles and spray jets.

More specifically it is an object of the invention to provide a wet dust collector of the so-called cyclone type in which the axis of the cyclone shell or casing is disposed horizontally, or substantially so; in which the whirling path of the air is controlled by a helical blade or screw within the casing having several convolutions or turns causing the air to whirl within the casing through preferably several complete revolutions; and in which the dust laden air during each revolution is caused by centrifugal force to strike the surface of a body of liquid or water resulting in wetting the inner surface of the shell and trapping the dust particles. As a consequence of the improved construction and mode of operation, the air emerging from the machine will not only be free of dust but also of entrained liquid and the liquid containing the dust in suspension will gravitate to the sludge tank in the bottom of the machine.

Other objects of this invention will appear in the following description and appended claims, reference being had to the accompanying drawings forming a part of this specification wherein like reference characters designate corresponding parts in the several views.

Fig. 1 is a front elevation, partly broken away, illustrating an air cleaner or dust collector embodying the present invention.

Fig. 2 is a vertical section taken substantially through lines 2—2 of Fig. 1 looking in the direction of the arrows.

Fig. 3 is a vertical section taken substantially through lines 3—3 of Fig. 1 looking in the direction of the arrows.

Fig. 4 is an end elevation of the core or inner pipe formed with a helical or screw blade.

Fig. 5 is a view, in part similar to Fig. 1, illustrating a second embodiment of the invention.

Fig. 6 is a view, in part similar to Fig. 1, illustrating a further embodiment of the invention.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In the drawings I have illustrated, by way of example, several embodiments of the invention as applied to an air cleaner or dust collector of the type suitable for factory installations. It will be understood, however, that the invention is susceptible to a wide variety of uses and is capable of being incorporated in different embodiments and structures. Many adaptations of the invention are, therefore, possible and accordingly it is understood that the present embodiments are merely illustrative.

Referring to Figs. 1 to 3 inclusive, the air cleaner or dust collector therein illustrated comprises a main outer shell or casing 10 which is preferably formed from sheet metal into substantially pear shape in cross-section, said casing comprising an upper cylindrical portion merging into a lower portion of tapering formation produced by causing the side walls 10a and 10b to converge so as to leave a relatively narrow longitudinal gap or space therebetween at the lower edges thereof. The casing 10 is provided at one end with an inlet 11 through which dust-laden air enters the casing and flows downwardly in a direction substantially tangential to the curved side wall of the casing. At its opposite end the casing is provided with a clean air outlet 12 through which the air, after passing through the casing, flows out in a horizontal and transverse direction substantially tangential to the top curved wall of the casing. As illustrated in Fig. 2, a portion of the upper wall of the casing 10 is extended or expanded vertically as at 10c so as to form an upwardly and outwardly directed passage terminating in the outlet 12 which lies mainly above the top of the casing.

Rigidly attached to the lower terminal edges of the converging walls 10a and 10b is a generally U-shaped casing member 13 which may be formed from sheet metal with the upper edges thereof permanently secured, as by butt welding, to the edges of the walls 10a and 10b so as to provide a liquid-tight joint along the meeting edges. The casing members 10 and 13 thus form together the main housing or shell of the collector which is provided with end walls and, except as hereinafter explained, is entirely closed at the top, sides, bottom and ends. The bottom casing portion 13 forms a sludge tank or sump adapted to contain a body of water which provides a liquid medium by means of which the dust or foreign particles are collected during operation of the machine. The sludge which is thus produced after predetermined operation may be readily drained off in order to replenish the tank with a fresh supply as may be desired. To facilitate draining off of the sludge by gravity from the tank or sump 13 the latter is formed of increasing depth from the end 13a thereof at the outlet end of the machine to the end 13b so that the bottom of the sludge tank will slope from one end to the other. At the latter end of the tank a drain opening is provided which is closed and sealed by means of a removable closure or door 16. The outer shell or casing of the collector may be supported in any suitable manner such as by means of a horizontal generally rectangular frame 14 carried by four standards or uprights 15.

Extending horizontally through the outer casing or shell 10 from the inlet end thereof to a point adjacent the outlet is a hollow pear-shaped core or pipe 17 which is in the form of a screw having a continuous screw blade or fin 18 rigidly attached to the exterior surface of the core. This blade is constructed with a number of convolutions extending helically at the desired pitch around the core and has the outer edge 18b shaped or contoured to correspond to the pear-shaped contour of the casing member 10. Thus, the core 17 with its helical screw blade 18 fits snugly within the casing member 10, with the outer edges of the blade engaging uniformly the inner surface of the casing member and providing a tight joint from one end of the blade to the other. The blade may be rigidly secured to the inner wall of the casing, as by welding, so as to hold the core in fixed relation to the casing. In accordance with the preferred construction the screw blade 18 does not reach down to the bottom of the collector but the lower edge of each flight of the blade is cut off horizontally at 18a, preferably at the juncture of the casing member 10 and the sludge tank 13. The screw flight commences at a point 19 (Fig. 3) at the end wall of the casing and at the side of the core 17 opposite to the inlet 11. It will be noted that the core 17 has a cross-section which is uniform in shape and size, generally similar in contour to the casing 10, from a point 20 adjacent the inlet end wall of the casing to a point 21 adjacent the last flight of the screw blade, and between these points the blade is uniform in width. From the point 21 the core is formed with an upwardly extended or expanded portion 22 which progressively reduces the clearance or space between the core and the upper wall of the casing and thus produces a constricted passage 23 having its narrowest point at 23a, as indicated in Fig. 2. From this point, where the space between the core 22 and casing 10 is narrowest the wall of the core sweeps or curves inwardly at 24 to provide a space or passage 25 of increased width between the core and the wall of the casing. At this locality the side wall of the core and the screw blade are cut off, terminating at a point 26 so as to leave the end of the casing opposite the outlet 12 open and unobstructed. Thus, it will be seen that the outlet end of the core is shaped so as to produce a constricted or narrowed passage 23 between the core and casing, and from this point the space or passage between the core and casing widens out to a terminal point in advance of the outlet.

A supply of cleaning liquid 27, such as water, is introduced into the casing, filling the sludge tank 13 and rising to a predetermined level 27a. Since the bottom flights of the screw blades are at all times submerged within the liquid 27 they in effect act to partition the space within the shell 10 and below the core 17 into separate spaces or compartments 28, 29, 30 and 31 having in each a column of liquid maintained at a predetermined level below the inner core so as to provide a restricted space or passage for the flow of air around the bottom of the core. I prefer to cut off the screw blades at 18a across the bottoms of their flights so as to cause the sludge tank 13 to communicate in common with all of the compartments 28–31. This construction has the advantage of enabling the cleaning liquid or water to be supplied to the machine from a single inlet connection, enables the liquid levels in all of the compartments to be controlled or maintained by a single overflow pipe and permits the sludge to be withdrawn from the collector through a single clean-out door 16.

In order to establish during operation the desired liquid level 27a and, hence, maintain the proper air gap between the liquid level and bottom of the core 17 in each of the compartments 28, 29 and 30, any suitable control means may be employed for this purpose. In the present instance I employ a device which will furnish a constant supply of liquid or water to compensate for loss due to evaporation and which also embodies an overflow pipe to control the level of water at all times. A tank 32 is mounted at the side of the casing 10, the lower end thereof communicating with the interior of the casing by means of a pipe 33 entering the casing below the liquid level. The upper end of the tank 32 is connected to the casing above the liquid level by means of a pipe 34 providing an air vent. An overflow pipe 35 extends into the tank 32 and is adjusted so that the upper end of the overflow pipe will terminate at a point determining the desired liquid level in the casing. Fresh water is supplied to tank 32 through a pipe 36 (Fig. 1). To provide an air seal for the overflow pipe the lower end of the latter is submerged in a tank 37, open to atmosphere at its top, and from this tank a second overflow pipe 38 leads to the sewer. Since a partial vacuum will be created during operation of the collector in the space within tank 32 above the upper end of overflow pipe 35, due to the air vent 34, a column of water will rise part way in the height of pipe 35 as determined by the difference in pressures outside and inside the tank 32. Since a constant predetermined flow of fresh water enters the tank 32 through inlet pipe 36 a column of water will be maintained therein to the height of pipe 35 which accordingly determines the height of the liquid 27 within the casing. Where it is desired to partially drain the liquid out of the casing I provide a drain pipe 39 suitably connected to the sludge tank at a selected point. By means of a manually operable valve device 40 liquid may be withdrawn from the casing and tank to the level of the pipe connection 39 therewith.

It will be understood that the dust laden air entering the inlet 11 may be caused to flow through the collector by any suitable means capable of inducing flow of the air at predetermined velocity. This may be accomplished, for example, by means of a blower or fan interposed between the source of dust laden air and the inlet 11 or by means of a suction fan arranged adjacent or beyond the outlet 12 in the clean air conduit. In Fig. 2 I have indicated, by way of example, an exhaust fan 41 arranged in an outlet conduit 42 leading from the outlet 12 of the collector and driven in any suitable manner so as to induce a flow of air through the collector.

Dust laden air enters the collector tangentially through the inlet 11 and proceeds downwardly, initially flowing at relatively high velocity through the gap or passage 28 between the liquid and the bottom of the core 17 as shown by the arrow in Fig. 3. The air is compelled to follow a helical path as defined by the confined space between the helical surfaces of the blade 18, the core 17 and the outer shell 10. After passing through the gap or space 28 the air is whirled around the core and then passes through the second gap or space 29. Continuing from this point the air again whirls around the core and passes through the gap or restricted passage 30. Thence, the air proceeds upwardly and flows through the constricted passage 23 as a result of which it attains a materially higher velocity. The air flows out through the expanding passage 25 into the open space or compartment 31 and proceeds in a spiral path, indicated by the arrow in Fig. 2, to the outlet 12.

On account of the helical path the air is compelled to take and the relatively high tangential velocity of the air as it flows downwardly at each course, the air will impinge against the surface 27a of the liquid as it changes direction and passes through the successive restricted spaces or passages 28, 29 and 30. The greater the tangential velocity of the air the greater will be the centrifugal force with which the air and the dust carried thereby will be thrown against the water in these restricted spaces. The impact of the air against the water as well as the friction of the air against the surface of the water will produce a spray which will be carried upwardly along and around the inner surface of the shell 10 resulting in wetting this surface. Due to centrifugal force some of the dust and foreign particles in the air will be trapped in the body of liquid at the bottom of each of the restricted spaces or compartments 28, 29 and 30. The remaining dust or foreign particles borne by the air will be thrown by centrifugal force against the wetted inner surface of the casing 10 and will be trapped by the liquid and carried by gravity into the sludge tank. Many of the dust particles not permanently trapped during the first revolution around the core 17 will be partly wetted either by the spray or the wetted surface of the shell 10 and thus will be made heavier so that they will be more readily trapped during the succeeding revolution. As the air flows through each restricted passage it will by impingement with the surface of the liquid produce a fine spray or vapor. Much of the liquid initially entrained with the air as a result of this impingement is thrown and deposited by centrifugal force against the inner surface of the casing, carrying with it dust particles washed out of the air. The action is in effect a multiple wash accompanied by separation of liquid and dust from the air by centrifugal force. Any desired number of revolutions of the air around the screw core may be utilized, depending upon conditions of available space for the machine, the size thereof, suction or flow capacity of the fan and manufacturing requirements. For best results at least two washes are preferred, although a greater number may be used as desired.

It will be noted that the core 17 and shell 10, instead of being formed cylindrical, are pear-like in shape so as to cause the side walls to converge downwardly. This preferred cross-sectional shape has a number of advantages. By thus reducing the radius of the air path just above the liquid level the centrifugal force is increased for the same air velocity. Greater impingement action of the dust laden air against the surface of the liquid is produced while at the same time reducing the surge of the liquid on account of the reduction in the free or exposed surface area of the liquid. Another advantage of this construction resides in the fact that the depth of the liquid may be increased without increasing the volume of liquid stored in the collector and correspondingly increasing the size thereof. A more efficient and compact air cleaner is thus provided by the present construction.

Since the sludge tank in the preferred embodiments is in communication with and common to all of the compartments or spaces 28—31 it will be seen that the liquid levels in all compartments will bear a definite relationship one to the other. Due to dynamic and friction losses there will normally exist some differences in static pressure in the compartments 28—31. This pressure will progressively decrease in the sucessive compartments, meing accompanied therefore by a small progressive rise in the level of the liquid. For example, assuming the pressure drop during one complete revolution of the air around the screw is one inch (measured with an ordinary water gauge) then the water or liquid level difference between two adjacent and inter-communicating compartments will also be one inch. Consequently, the liquid level will rise one inch at each successive compartment, or at each successive thread of the screw, in the direction of flow from the inlet to the outlet. In Fig. 1 the normal liquid level when the collector is idle is indicated at 27a. During operation this level will be maintained in compartment 28. The progressive rise of the liquid level in the succeeding compartments due to static pressure drop is also indicated, merely for exemplication, in Fig. 1.

In order to achieve maximum efficiency in operation it is desirable to maintain as closely as possible a constant air velocity through the machine, and to accomplish this the air gaps between the liquid level and the bottom of the screw core 17 should be maintained constant. In accordance with the present invention this may be accomplished in several ways. The pitch of the screw blade 18 may be increased in direct proportion to the decrease in height of the air gap. Thus, the distance between adjacent flights of the blade may be increased so as to increase the area of each gap 29 and 30 an amount sufficient to compensate for the decrease in the depth thereof due to the rise in liquid level.

On the other hand, as illustrated in the embodiment of Fig. 5, the bottom of the core 17 may be of stepped formation so as to increase successively the depths of the air gaps in proportion to the increase in height of the liquid level. Assuming that the liquid level in compartment 29 rises one inch above the level in compartment 28, and that the liquid level in compartment 30 rises one inch above the level in compartment 29, then the bottoms 17b and 17c of the core 17 may be successively raised one inch as compared with the bottom 17a of the core in compartment 28. Other than the foregoing the construction of the air cleaner or dust collector in the embodiment of Fig. 5 is the same as in the previous embodiment.

In the embodiment of Fig. 6 compensation for static pressure loss and variation in air velocity is accomplished by sloping the bottom of the core 17. Thus, the bottom portions 17d, 17e and 17f of the core in the successive compartments 28—30 may be uniformly sloped or inclined so as to produce an average increase in the air gaps in compartments 29 and 30 corresponding to the increase in the liquid levels therein due to static pressure drop. Other than this modification the construction of the air cleaner in the embodiment of Fig. 6 is the same as in Figs. 1 to 4 inclusive.

Although during the operation of the present air cleaner a remarkably small amount of the water or liquid is entrained with or carried in suspension by the air, being mainly separated therefrom by centrifugal force, I prefer to provide additional means at the exit end of the collector for ensuring elimination of substantially all liquid carried in suspension by the air before the clean air leaves the collector. This I also prefer to accomplish by the use of centrifugal action. As previously pointed out, the surface of the core or inner pipe 17 (see Fig. 2) is expanded upwardly at 22 thus producing a progressively narrowing passage 23. As the air passes out of the bottom passage 30 and flows upwardly and outwardly through restricted passage 23, its tangential velocity increases resulting in a corresponding amplification of centrifugal force and causing all remaining water and dust particles carried in suspension by the air to be thrown against the inside surface of the shell 10. Since the cross-sectional size of the passage increases beyond the narrowest restriction at 23a the air will rapidly expand beyond this point and will lose velocity. The liquid and wetted dust particles thrown out against the shell, due to their greater mass and inertia, will continue to hug the inner surface of the shell 10 and will flow down into the bottom of the collector as indicated by the arrow A in Fig. 2. The air, in the meantime having lost velocity, will not have sufficient energy left to pick up any more liquid by impingement with the surface thereof and, hence, will flow direct to the outlet 12, as shown by the arrow B in Fig. 2, free of any appreciable entrained liquid.

From the foregoing it will be seen that I have provided a wet cyclonic dust collector of relatively simple and compact construction which essentially embodies a spiral or helical tunnel through which the air at relatively high velocity whirls in a spiral or helical path about an axis which is disposed generally in a horizontal direction or at least in such direction approaching the horizontal as to permit the air to impinge against the surface of a body of liquid as it reaches the bottom of each revolution in its helical course. Dust particles suspended in the air and liquid entrained therein are expelled or thrown outwardly against the outer wall of the tunnel and flow down by gravity into the body of liquid in the bottom of the collector while the clean air flows out of the collector substantially free of dust and water.

I claim:

1. An air cleaner comprising a main outer casing member, an inner casing member disposed within said outer member and spaced therefrom, the lower portion of each casing member being formed by downwardly converging side walls, a helical blade interposed between said members and forming a helical passage between said members, said blade having the opposite edge portions thereof conforming to the shape of the opposed surfaces of said casing members, a tank communicating with said passage at opposite sides of the lower portion or portions of said blade, means for maintaining a body of liquid within the tank and within the lower portion of the outer casing member at a level or levels to cause the lower portion or portions of said blade to be constantly submerged in the liquid and to form restricted spaces between the surface of said liquid and the bottom of the inner casing member whereby air flowing through said passage will impinge against said surface.

2. An air cleaner comprising a main outer casing member, an inner casing member disposed within said outer member and spaced therefrom, the lower portion of each casing member being formed by downwardly converging side walls, a helical blade interposed between said members and forming a helical passage between said members, said blade having the opposite edge portions thereof conforming to the shape of the opposed surfaces of said casing members, a tank communicating with said passage at opposite sides of the lower portion or portions of said blade, means for maintaining a body of liquid within the tank and within the lower portion of the outer casing member at a level or levels to cause the lower portion or portions of said blade to be constantly submerged in the liquid and to form restricted spaces between the surface of said liquid and the bottom of the inner casing member whereby air flowing through said passage will impinge against said surface, said tank having a bottom sloping toward one end, and outlet means at said end to permit the removal of sludge from the tank.

3. An air cleaner comprising a main outer casing member having a substantially arcuate upper portion, an inner casing member spaced from the outer member and also having a substantially arcuate upper portion, the side walls of each casing member below said arcuate portion converging downwardly to form the lower portion of each casing member narrower than the upper portion, a helical blade interposed between said members and fitting between said upper and lower portions of the casing members to form a helical passage therebetween, a tank communicating with said passage, means for maintaining a body of liquid in the tank and at a level or levels in the lower portion of the outer casing member to completely submerge at all times the bottom of said blade thereby to provide a passage between the body of liquid and the inner casing member through which the air flows and impinges against the surface of the liquid.

4. An air cleaner comprising a main outer casing member having a substantially arcuate upper portion, an inner casing member spaced from the outer member and also having a substantially arcuate upper portion, the side walls of each casing member below said arcuate portion converging downwardly to form the lower portion of each casing member narrower than the upper portion, a helical blade interposed between said members and fitting between said upper and lower portions of the casing members to form a helical passage therebetween, a tank communicating with said passage at opposite sides of the lower portion or portions of said blade and having an outlet at an end thereof to permit the removal of sludge from the tank, means for maintaining a body of liquid in the tank and at a level or levels in the lower portion of the outer casing member to completely submerge at all times the bottom of said blade thereby to provide a passage between the body of liquid and the inner casing member through which the air flows and impinges against the surface of the liquid.

5. An air cleaner comprising a main casing member, an inner casing member disposed within said main casing member and spaced therefrom, a helical blade interposed between said members and forming therewith a continuous helical passage extending through a plurality of convolutions around the inner member, a tank extending below said main casing member and communicating with lower portions of said helical passage at opposite sides of the lower portion or portions of said blade, said tank having an outlet for the removal of sludge from the tank, means for supplying liquid to said tank and for maintaining a body of the liquid within said tank and the lower portion of the main casing member at a level or levels to completely submerge at all times the bottom of said blade and to form restricted spaces between the surfaces of the liquid and the bottom of the inner casing member within which the air flowing through the passage constantly impinges against the surface of said liquid causing the air to entrain liquid and deposit the same by centrifugal action against the outer casing wall and wet the surfaces thereof, such centrifugal action causing dust or particles in the air to be deposited on said wetted surfaces, said inner casing member having successive bottom portions disposed at successively increasing levels in the direction of air flow.

6. An air cleaner comprising a main casing member, an inner casing member disposed within said main casing member and spaced therefrom, a helical blade interposed between said members and forming therewith a continuous helical passage extending through a plurality of convolutions around the inner member, a tank extending below said main casing member and communicating with lower portions of said helical passage at opposite sides of the lower portion or portions of said blade, said tank having an outlet for the removal of sludge from the tank, means for supplying liquid to said tank and for maintaining a body of the liquid within said tank and the lower portion of the main casing member at a level or levels to completely submerge at all times the bottom of said blade and to form restricted spaces between the surfaces of the liquid and the bottom of the inner casing member within which the air flowing through the passage constantly impinges against the surface of said liquid causing the air to entrain liquid and deposit the same by centrifugal action against the outer casing wall and wet the surfaces thereof, such centrifugal action causing dust or particles in the air to be deposited on said wetted surfaces, said casing members being narrowed at their lower portions to cause air to flow through said restricted spaces around the bottom of the inner casing member in a relatively sharply curved path.

GIOVANNI C. ZILIOTTO.

REFERENCES CITED

The following references are of record in the file of this patent:

UNITED STATES PATENTS

| Number | Name | Date |
| --- | --- | --- |
| 716,380 | Clawson | Dec. 23, 1902 |
| 938,356 | Wait | Oct. 26, 1909 |
| 948,062 | Morgan | Feb. 1, 1910 |
| 1,595,268 | Van Petten et al. | Aug. 10, 1926 |
| 2,193,209 | Sandberg | Mar. 12, 1940 |